Jan. 8, 1952     A. C. HALLER     2,582,118
AIRPLANE WITH MOVABLE WING TIPS
Filed May 20, 1946     3 Sheets-Sheet 1
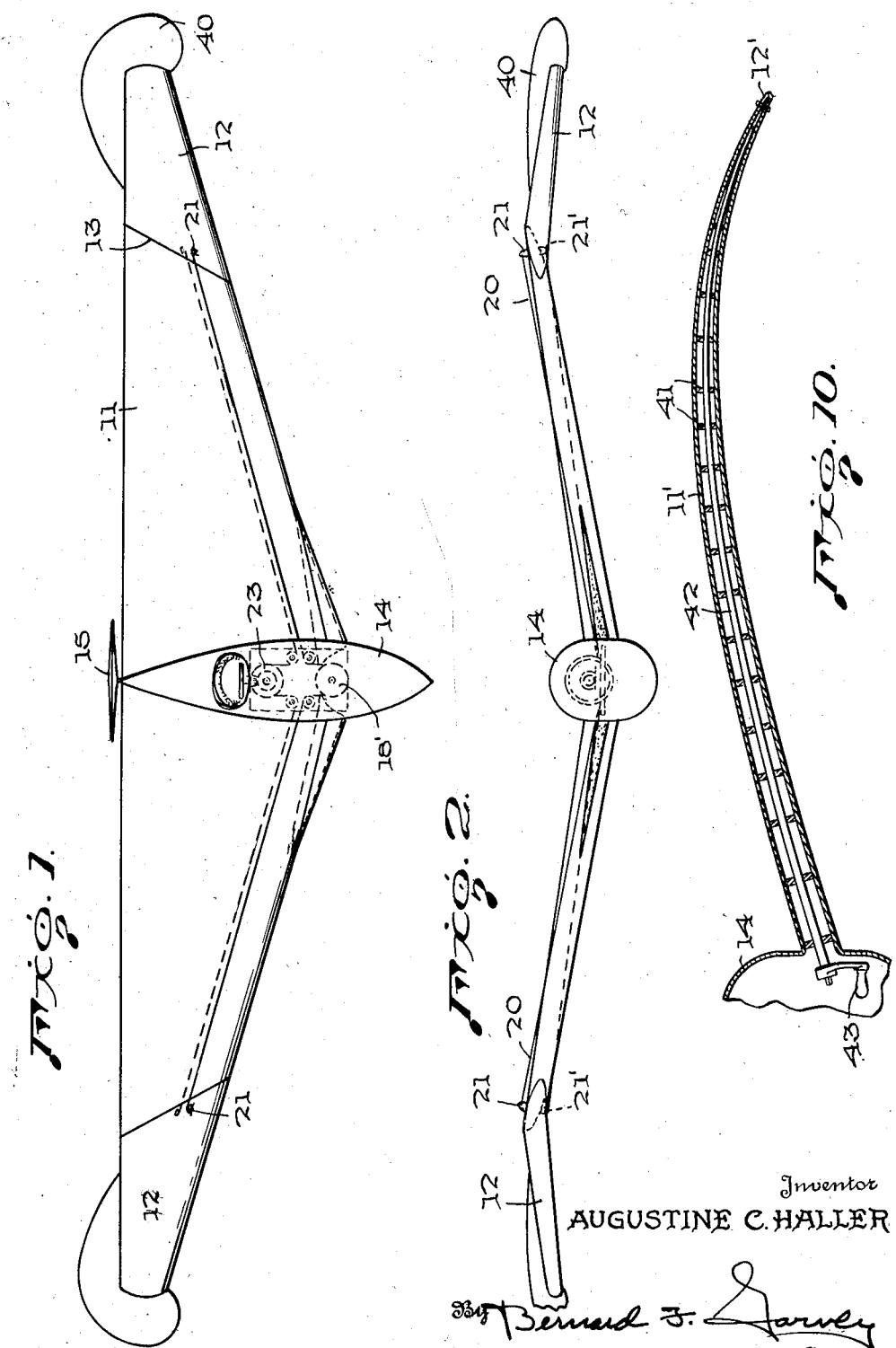
Inventor
AUGUSTINE C. HALLER
By Bernard F. Garvey
Attorney Jan. 8, 1952 A. C. HALLER 2,582,118
AIRPLANE WITH MOVABLE WING TIPS
Filed May 20, 1946 3 Sheets-Sheet 2
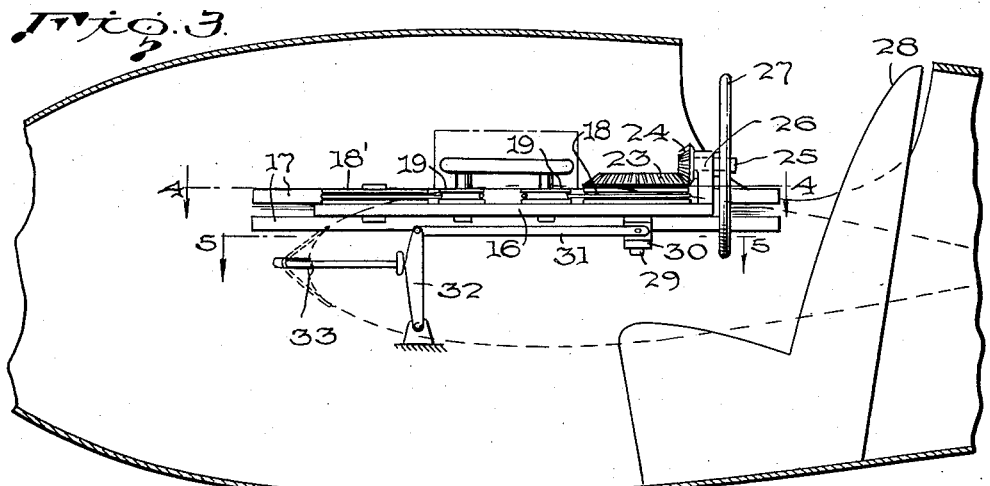
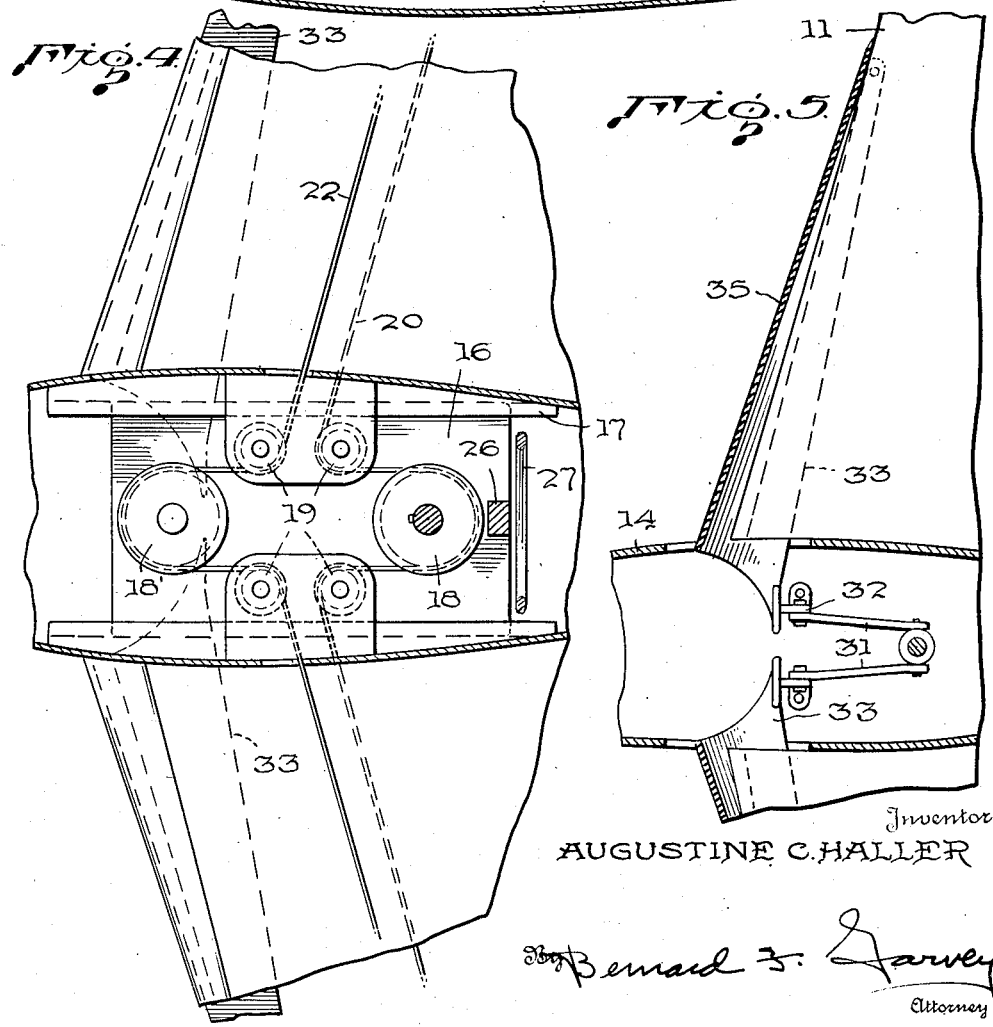
Inventor
AUGUSTINE C. HALLER
By Bernard F. Garvey
Attorney Jan. 8, 1952           A. C. HALLER           2,582,118
AIRPLANE WITH MOVABLE WING TIPS
Filed May 20, 1946           3 Sheets-Sheet 3
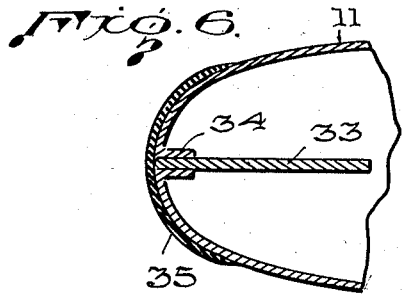
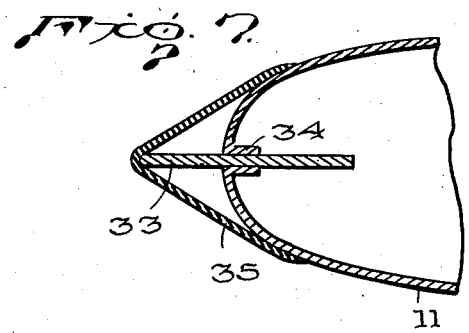
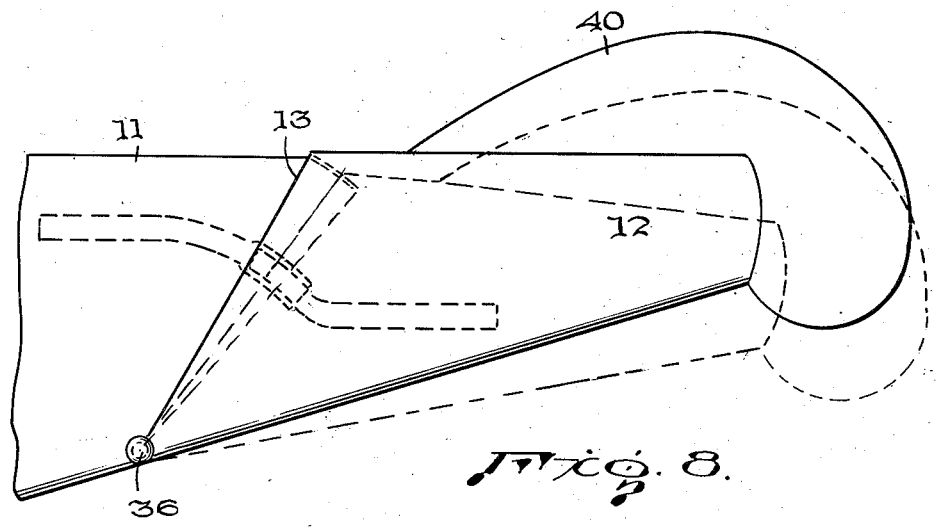
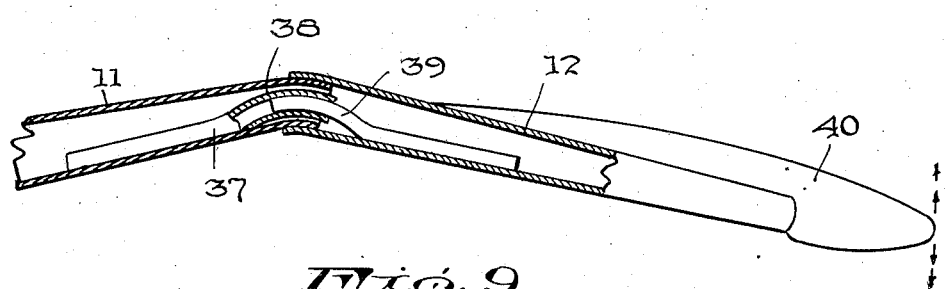
Inventor
AUGUSTINE C. HALLER
By Bernard F. Garvey
Attorney Patented Jan. 8, 1952

2,582,118

UNITED STATES PATENT OFFICE 2,582,118

AIRPLANE WITH MOVABLE WING TIPS

Augustine C. Haller, Berwyn, Md.

Application May 20, 1946, Serial No. 671,081

3 Claims. (Cl. 244—13)

This invention comprises an airplane employing a single wing, the tips of which are movable from a fuselage in the wing body, the tips, in conjunction with a wing carried stall strip, constituting the sole control means for the airplane in take off, in landing and in flight.

An object of this invention is to provide a tailless airplane in which the control surfaces are transferred to the wing tips, the latter being hingedly connected to the wings. Movement of the wings is completely within the control of the operator and the tips are in operative connection with a wing carried stall strip, which operates in unison with the tips, to better promote longitudinal stability in the low angle of attack range.

It is also an object of my invention to provide wing carried control tips operable similarly for dive or climb, the tips being also operable differentially by the same means, to effect yawing and rolling correspondingly causing the airplane to bank and turn.

Tests have shown that with the present invention as the tips move down, causing their angle of attack to the relative wind to become increasingly more negative, the center section is forced to assume an increasingly more positive angle of attack.

Other objects of the invention will be manifest from the following description of the present preferred forms of the invention, taken in connection with the accompanying drawings, wherein:

Figure 1 is a top plan view of an airplane constructed in accordance with the present invention;

Figure 2 is a front elevational view of the same;

Figure 3 is a detail fragmentary longitudinal sectional view taken through the fuselage of the airplane showing to advantage the operating mechanism;

Figure 4 is a detail fragmentary sectional view taken on the line 4—4 of Figure 3, looking in the direction of the arrows, showing the operating mechanism in top plan;

Figure 5 is a detail fragmentary sectional view taken on line 5—5 of Figure 3, showing to advantage the stall strip operating mechanism;

Figure 6 is a detail fragmentary sectional view of the leading edge of the wing showing the stall strip detracted;

Figure 7 is a similar view showing the stall strip in ejected position;

Figure 8 is a detail fragmentary top plan view of the wing showing the manner of hingedly mounting the wing tip thereon, dotted lines being used to show a forward position of the tip;

Figure 9 is a detail fragmentary sectional view of the wing and wing tip illustrating to advantage the hinge connection between the wing and tip; and Figure 10 is a detail longitudinal sectional view of a modified form of wing with a hinged wing tip and showing a torque rod extending through the wing for operating the tip.

The invention comprises a single wing 11 of substantially conventional design equipped with movable tips 12 which are hinged at an acute angle to the aft edge of the wing as illustrated generally at 13. The wing also embodies a fuselage 14 which extends transversely through the wing centrally of the latter, the aft end of the fuselage being equipped with a pusher propeller 15. The forward end of the fuselage, as illustrated to advantage in Figure 1, is adapted to project appreciably beyond the leading edge of the wing 11.

The operating mechanism for the tips 12 includes a platform 16 which is slidably mounted between guides 17 located on the side walls of the fuselage. The platform carries a drive pulley 18, driven pulley 18'. Two pairs of oppositely disposed idler pulleys 19 are mounted on the side walls of the fuselage so that they are located substantially in the plane of pulleys 18 and 18'. Trained over the drive pulley 18 and a pair of idlers 19, is an operating cable 20, the free ends of which are engaged with lugs 21, one of which is carried by each of the wing tips 12. A second operating cable is employed, designated 22, which is trained over the two remaining idler pulleys 19 and driven pulley 18', the free ends of the cable being engaged with lugs 21', one of which is also carried by each of the wing tips 12. As illustrated to advantage in Figure 2, the lugs 21 extend above and the lugs 21' below the wing. The drive pulley 18 carries a bevel gear 23 which is enmeshed with a bevel pinion 24, the pinion being carried by a shaft 25 which extends through a bearing 26, the latter rising upwardly from the upper face of the movable platform 16. The shaft 25 has fixedly secured thereto, an operating wheel 27 which is positioned in operative proximity to a pilot seat 28.

It will also be noted, upon reference to Figure 3, that the drive pulley 18 is equipped with a stub shaft 29 which carries a sleeve 30, the sleeve being engaged by the inner ends of a pair of links 31. The outer ends of the links are pivotally engaged with levers 32, each of the levers being operatively engaged with the inner margin of a stall strip 33. A pair of the stall strips 33 are employed, one being mounted on each side of the fuselage 14. As shown to advantage in Figures 6 and 7, each of the stall strips is slidably engaged between ribs 34 which extend longitudinally along the inner forward wall of the leading edge of the wing 11. When the strip is in retracted position as shown in Figure 6, its front margin is in alignment with the leading edge of the wing. In extended position, the forward margin of the strip extends appreciably in front of the leading edge of the wing, movement of the strip being limited by a resilient cap or sheet 35. The marginal edges of the sheet are secured to the outer faces of the wing 11, as shown in Figure 7.

Each of the tips 12 is movably mounted in a fore and aft position as well as up and down. In order to permit this movement, the tip is hinged at an acute angle to the aft edge of the wing measured from the tip end. The forward end of the tip is swiveled to the wing as indicated at 36. One preferred form of hinge, in conjunction with the swivel 36, consists of a tube 37 mounted in the wing 11. As shown in Figures 8 and 9, the outer end of the tube is disposed at an arc toward the leading edge of the wing, as illustrated at 38. The extreme terminal of the free end of the tube projects slightly beyond the free terminal of the wing 11. The free end of the tube 37, in addition to being arched forwardly, is also arched upwardly as advantageously illustrated in Figure 9. This elevates the free end of the tube above the plane of the tube body and disposes this portion of the tube approximately midway between the upper and lower walls of the wing 11. Complementing the end 38 of the tube is a rod 39 carried by each tip 12, the free end of the rod conforming to the contour of the free end 38 of the tube and being slidably mounted therein. This provides a cone hinge to permit torsional movement of the tip when pressure is exerted thereon through the control cables 20, 22. Each of the tips 12 is also equipped with a fin 40 which extends parallel to the chord line of the wing.

In the modification of the invention illustrated in Figure 10, a wing 11' is illustrated which carries a wing tip 12'. The wing carries a plurality of spaced supporting plates 41 through the center of which a torque rod 42 extends. The outer end of the torque rod engages the wing tip 12'. The inner end may be engaged with any suitable operating means such as a crank 43.

In operation, by pushing or pulling on the control wheel 27, the platform 16 is moved during dive and climb. Correspondingly the cables 20 and 22 are operated, resulting in up or down movement of the tips 12. By rotating the control wheel 27, the drive pulley 18 and driven pulley 18', are turned in opposite directions thereby causing the operating cables 20 and 22 to pay out or pay in, moving the wing tips differentially. Movement of the tips up and down, causes the plane to dive or climb. Movement of the tips differentially results in yawing and rolling, employed when it is desired to bank and turn.

Although I have herein described preferred forms of the invention, it is to be understood that various changes may be made in the details of construction, proportion and arrangement of parts, within the scope of the claims hereto appended.

What I claim is:

1. An airplane comprising a wing having a main wing portion and tip portions forming continuations of the main wing portion, each tip portion and the main wing portion having the adjacent edges thereof disposed diagonally with respect to the longitudinal dimensions of the wing to permit fore and aft and up and down movements of each tip portion, and means operatively connecting each tip portion with the main wing portion comprising a swivel connection between each tip portion and main wing portion adjacent the leading edge of the wing, and a hinge connection between the wing portions intermediate the leading and trailing edges of the wing for guiding the tip portion in its aforementioned movements.

2. An airplane comprising a wing having a main wing portion and a tip portion forming a continuation of the main wing portion, said main wing portion and said tip portion having the adjacent edges thereof disposed diagonally with respect to the longitudinal dimensions of the wing to permit fore and aft and up and down movements of the tip portion and means operatively connecting said tip portion with the main wing portion comprising a swivel connection between said tip portion and main wing portion adjacent the leading edge of the wing, and a hinge connection between said main and tip wing portions intermediate the leading and trailing edges of the wing comprising a tube secured in the main wing portion and a complemental rod secured to the tip portion, one end of the rod being slidably mounted in the tube for guiding the tip portion in its aforementioned movements.

3. An airplane comprising a wing having a main wing portion and tip portions forming continuations of the main wing portion, each tip portion and the main wing portion having the adjacent edges thereof disposed diagonally with respect to the longitudinal dimensions of the wing to permit fore and aft and up and down movements of each tip portion, and means operatively connecting each tip portion with the main wing portion comprising a swivel connection between each tip portion and main wing portion adjacent the leading edge of the wing, and a hinge connection between the wing portions intermediate the leading and trailing edges of the wing including a tube secured to the main wing portion and a rod interfitting with the tube and secured to the tip portion of the wing, the contiguous portions of the tube and rod being arched forwardly and upwardly to guide the tip portion in its aforementioned movements.

AUGUSTINE C. HALLER.

REFERENCES CITED

The following references are of record in the file of this patent:

UNITED STATES PATENTS

| Number | Name | Date |
|---|---|---|
| 1,858,259 | Alfaro | May 17, 1932 |
| 2,037,626 | Hall | Apr. 14, 1936 |
| 2,062,148 | Snyder | Nov. 24, 1936 |
| 2,108,093 | Zimmerman | Feb. 15, 1938 |
| 2,170,787 | Rose | Aug. 22, 1939 |
| 2,191,842 | Back | Feb. 27, 1940 |
| 2,210,642 | Thompson | Aug. 6, 1940 |
| 2,293,644 | Gluhareff | Aug. 18, 1942 |
| 2,357,680 | Molloy | Sept. 5, 1944 |

FOREIGN PATENTS

| Number | Country | Date |
|---|---|---|
| 446,094 | Great Britain | Apr. 20, 1936 |
| 558,498 | Great Britain | Jan. 7, 1944 |